United States Patent [19]

Scarpatetti et al.

[11] Patent Number: 4,820,168

[45] Date of Patent: Apr. 11, 1989

[54] ELECTRICALLY CONDUCTIVE CONNECTION BETWEEN ABUTTING CONDUCT RAIL SECTION

[75] Inventors: Diether V. Scarpatetti, Esslingen; Dietrich Sahm, Bad Urach, both of Fed. Rep. of Germany

[73] Assignee: Daimler-Benz AG, Stuttgart, Fed. Rep. of Germany

[21] Appl. No.: 204,617

[22] Filed: Jun. 9, 1988

[30] Foreign Application Priority Data

Jun. 9, 1987 [DE] Fed. Rep. of Germany ....... 3719214

[51] Int. Cl.⁴ .................... B60M 5/00; H01R 41/00
[52] U.S. Cl. ................... 439/33; 191/44.1; 439/502
[58] Field of Search .......... 439/33, 502, 503, 115, 439/210, 213; 191/44.1, 29 R, 30, 32

[56] References Cited

U.S. PATENT DOCUMENTS

| | | | |
|---|---|---|---|
| 2,084,212 | 6/1937 | Moreira | 238/14 |
| 2,129,233 | 9/1938 | Peffers | 191/29 R |
| 2,180,350 | 11/1939 | Everett et al. | 470/502 |
| 2,268,043 | 12/1941 | Lavarack et al. | 439/502 |
| 2,831,071 | 4/1958 | Taylor | 191/44.1 |
| 3,316,362 | 4/1967 | Mayo et al. | 191/44.1 |

FOREIGN PATENT DOCUMENTS

| | | |
|---|---|---|
| 1885537 | 1/1964 | Fed. Rep. of Germany . |
| 1911315 | 7/1970 | Fed. Rep. of Germany . |
| 2237124 | 2/1974 | Fed. Rep. of Germany . |
| 8329847 | 10/1983 | Fed. Rep. of Germany . |
| 3211923 | 10/1983 | Fed. Rep. of Germany . |
| 0137677 | 10/1979 | Japan ..................... 439/502 |

OTHER PUBLICATIONS

"Aluminum–Verbundstromschiene" (*Electrische Bahnen*, (Electric Railways)) 1976, vol. 7; pp. 157–159, 2 cover sheets, and pp. 3–7.

*Primary Examiner*—Gary F. Paumen
*Attorney, Agent, or Firm*—Barnes & Thornburg

[57] ABSTRACT

The invention relates to an electrically conductive connection between abutting single sections of conductor rails. This connection is made by means of a current conduction cable consisting of bunched conductors and contact shoes. However, in order to be able to accommodate the current conduction cable within the cross-sectional contour of the conductor rails, the cable shoes are in each case constructed in the form of a cylindrical or prismatic connector pin which can be inserted into an opening of corresponding shape within the conductor rail. In most cases, such openings exist in any case in the conductor rails after these have been produced as a hollow section in an extrusion process. The connector pins are suitably of hollow construction and accommodate in their interior the bunched conductor which is only loosely enclosed by it. As a result, the bunched conductor can open out as a result of compression during a relative longitudinal movement of the connector pins.

9 Claims, 3 Drawing Sheets

4,820,168

ELECTRICALLY CONDUCTIVE CONNECTION BETWEEN ABUTTING CONDUCT RAIL SECTION

BACKGROUND AND SUMMARY OF THE INVENTION

The invention relates to an electrically conductive connection between abutting individual sections of conductor rails such as can be found to be known, for example, from the Journal "elektrische Bahnen" (Electric Railways) 1976 Volume 7, Pages 157 to 159.

Conductor rails of the type forming the basis in this case are used not only for crane installations but also for ground-level power supplies for electrically driveable vehicles of the local public passenger traffic system. The conductor rails are assembled piece by piece from transportable individual sections, in which arrangement a connection of good electrical conductivity must be created at the joints between the individual sections. Depending on the environmental climatic conditions, an expansion joint which can absorb longitudinal expansions of the conductor rails due to thermal conditions must be provided every 20 to 50 m. Hitherto, at least these types of expansion joints have been bridged by means of current conduction cables. At the normal joints between the individual sections of the conductor rails, permanent screw connections or welded joints were provided.

The disadvantgeous factor in the known electrically conductive connections is that they Protruded past the outside contour of the profile of the conductor rails and prevent a screw-less laying of the conductor rails within a prismatic electrically insulating shielding. However, the latter mentioned configuration would be particularly suitable for laying such conductor rails in a cost-effective manner.

An objection of the invention is to improve the electrically conductive connection of the conductor rail sections of the type mentioned above to such an extent that the connection can be efficiently applied and does not increase the outside contour of the conductor rail sections in the areas of their abutment.

According to the invention, this object is achieved by constructing a connector piece with bunched conductor cables and cable contact shoes such that the connector piece has a geometric cross-section which fits into openings in the respective adjacent conductor rail section to be joined. The electrically conductive connection is accordingly laid into the interior of the conductor rails and an insertion hardware is applied which can be produced by efficient means. In most cases, the opening required for the insertion hardware in the conductor rails exists in any case because the conductor rails are produced in more recent times as extruded hollow sections of aluminum. In embodiments where the connection according to the invention is applied to solid section conductor rails, an axially extending hole is applied in the front face area of the conductor rail sections.

In especially preferred embodiments the bunched conductor has an axial length of between 5 and 20 times the diameter of the hollow opening of the conductor rail sections being joined. Preferred embodiments also have the cross sectional area of the conductor rail opening which is 15 percent to 40 percent greater than the cross sectional area of the bunched conductor bundle when in a stretched or tensioned condition, whereby compression of the bundle during expansion and contraction of the conductor rail sections can be accommodated. Certain preferred embodiments form the conductive connector as a hollow connecting pin surrounding the bundle of bunched conductors, which hollow pin is provided with axially extending slots. Flanged sleeves are provided in certain embodiments surrounding the hollow connecting pin.

Other objects, advantages and novel features of the present invention will become apparent from the following detailed description of the invention when considered in conjunction with the accompanying drawings.

DETAILED DESCRIPTION OF THE DRAWINGS

Figure 1:
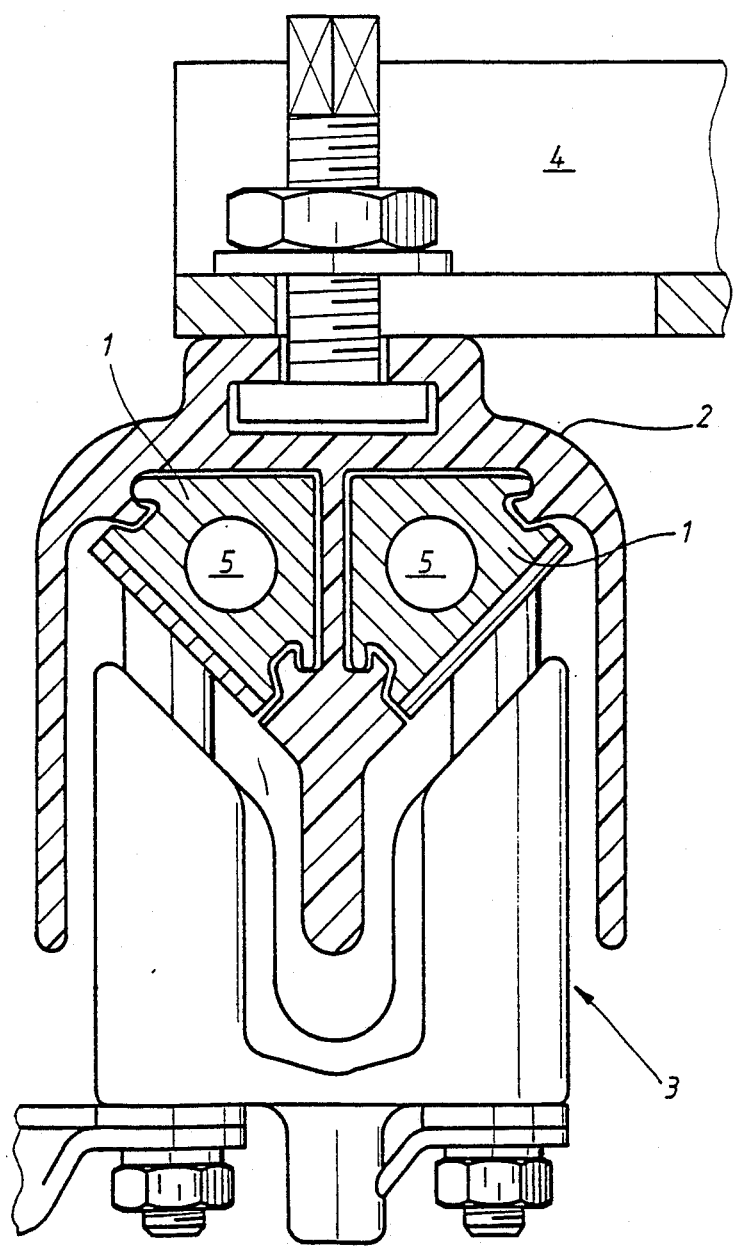
FIG. 1 is a schematic, part-sectional view through a two-pole power supply, arranged to be suspended, for a vehicle having a two-pole current collector head applied in a contact-making manner, constructed in accordance with a preferred embodiment of the present convention.

FIG. 1 shows the cross-section of a two-pole power supply such as can be used, for example, for rubber-tire track-guidable electrically driveable buses or similar vehicles of the local public passenger traffic system. The power supply is arranged at ground level. The current conducting conductor rails 1 must be mounted with good electrical insulation and follow the predetermined vehicle track, conforming to the track while maintaining a constant height. In addition, it should be possible to lay the conductor rails as cost-effectively as possible. For this purpose, a screw-less mounting of the conductor rails 1 within a shielding 2 is provided which is constructed as an integrated longitudinal carrier, insulator and channel for accommodating the individual conductor rail sections 1. At the top, a T groove is supplied into which hammer-head screws can be introduced for mounting to individual support arms.

The shielding 2 forms two relatively deep channels which are open towards the bottom and into which the conductor rails 1 can be screwlessly mounted and fastened. This is because the conductor rails, due to a corresponding profiling of the inside contour of the shielding 2 and of the outside contour of the conductor rails, can be axially inserted, in which arrangement longitudinal grooves and holding beadings engage one another. The contact tracks of the conductor rails, provided with stainless steel top layers, are inclined with respect to one another in a V shape and form a conductor rail prism, as it were, which has a self-centering effect on a correspondingly shaped current collector head 3. This type of conductor rail fastening can be inexpensively produced and efficiently installed due to the multiple function of the shielding 2, but presupposes mutual contact-making of the individual sections of the conductor rails 1 in the area of the joints which does not protrude past the cross-sectional contour of the conductor rails to the outside. Our commonly assigned application Ser. No. 07/204,257, filed June 9, 1988 based on German application P No. 37 19 213.2 filed in Germany on June 9, 1987, shows more details of a transport system with which the invention can be used.

Figure 2:
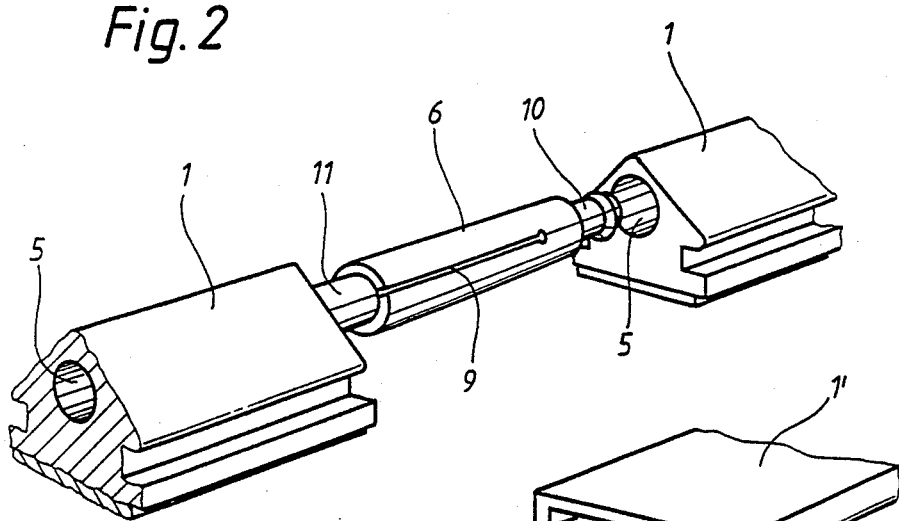
FIG. 2 is a schematic oblique view of the area of abutment of two conductor rail sections during the process of attaching the electrically conductive connection of FIG. 1.

For accommodating the non-protruding electrical connection of rail sections, the invention provides a current conduction cable which is formed by a short piece of a bunched conductor 7 and by connector pins 6 attached to both ends. In the illustrative embodiment according to FIG. 2 and FIG. 4, these connector pins are of circular cross-section which correspond to the openings 5 in the conductor rails 1. The connector pins can be inserted in a contact-making manner with their outside surface into the opening 5, a tight seat being provided for an electrically good line connection.

In the case of a normal conductor rail joint not stressed by thermal expansion, the current conduction cable does not need to allow for any longitudinal movements of the connectors with respect to one another so that the insertion depth of the connectors into the rail side openings would be irrelevant in such cases. In the case of expansion joints, a relative movement of the inserted connector pins can be absorbed starting from a greatly stretched condition of the bunched conductor and extremely opened expansion joint—the bunched conductor is pushed together into itself when the expansion joint narrows, during which process the bunched conductor opens out in diameter. Even if the current conduction cable is applied to expansion joints, it is not necessary to pay special attention to the depth of insertion of the connector pins into the rail-side opening because the connector pins pull out of the openings as required during the occurrence of extremely cold conditions if they had been inserted too deeply during the original assembly.

To achieve good contact-making between the connector pins and the inside surface of the opening 5 even with relatively large tolerances in diameter, the connector pin 6 is provided with longitudinal slots 9 so that the connector pin diameter can elastically adapt itself to the diameter of the opening 5.

To reduce the amount of material used and to be able to crimp the connector pins 6 more easily to the bunched conductor 7, the connector pin 6 is constructed to be hollow, the crimping 10 being applied between connector pin 6 and bunched conductor 7 at the end of the connector pin. In this arrangement, the two opposite connector pins 6 extend in a particularly suitable manner towards one another from the ends of the bunched conductor 7, the bunched conductor 7 extending in the interior of the hollow connectors 6. This makes it possible to keep the insertion depth of the connector pins as small as possible.

Figure 4A:
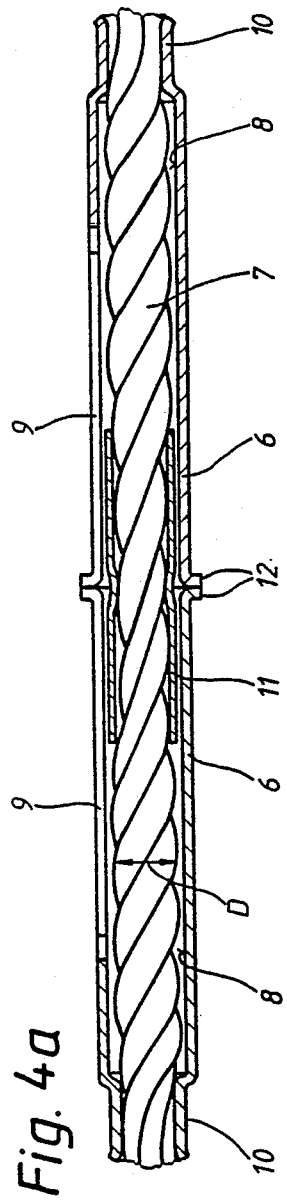
FIGS. 4a to 4c show an individual illustration of the current conduction cable according to FIG. 2 under different conditions.
Figure 4B:
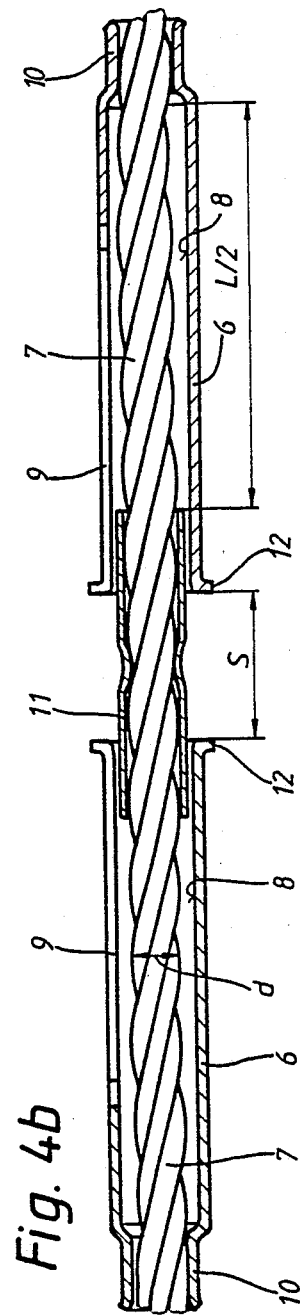

Regardless of a hollow construction of the connector pins which is to be suitably provided, the bunched conductor 7 should in any case extend in a hollow space 8, the clear cross-section of which is distinctly greater than the cross-section of the bunched conductor in the stretched condition according to FIG. 4b with the bunched conductor diameter d. In this condition of FIG. 4b, the bunched conductor is stretched by the stretch distance s compared with the compressed condition (bunched conductor diameter D) shown in FIG. 4a. The clear cross-section of the hollow space surrounding the bunched conductor 7 is at least 15 to 40 percent greater than the cross-sectional area enclosed by the outside contour around the bunched conductor 7 in the stretched condition. This overdimension of he hollow space is provided so that the bunched conductor 7 can be reliably accommodated in the compressed condition according to FIG. 4a with the bunched conductor 7 can be reliably accommodated in the pressed condition according to FIG. 4a with the bunched conductor diameter D. The dimension by which the bunched conductor is opened out when changing to the compressed condition certainly also depends on the length of the bunched conductor 7 itself. If a very long bunched conductor piece is used, the opening out in diameter will be distributed over a greater bunched conductor length and the increase in diameter will be less. For this reason, more clearance will have to be provided for an opening out of diameter in the case of short bunched conductors than in the case of long bunched conductors. The length of the hollow space which is suitable for accommodating the bunched conductor which opens out will suitably correspond to about 5 to 20 times the bunched conductor diameter d. In the illustrative embodiments shown, this length of hollow space is distributed to a hollow space section 8 to be allocated to one and the other connector pin 6.

The length of the connector pins will depend on the length of bunched conductor needed for accommodating the stretch distance s. This connector pin length will doubtlessly be greater than that corresponding to a design of a permissible loading in the contact area of the surface of the connector pin. So that the required cable length can be sufficiently deeply inserted into the openings 5, the connector pins are half as long as the required bunched conductor length in the compressed condition of the bunched conductor.

Figure 4C:
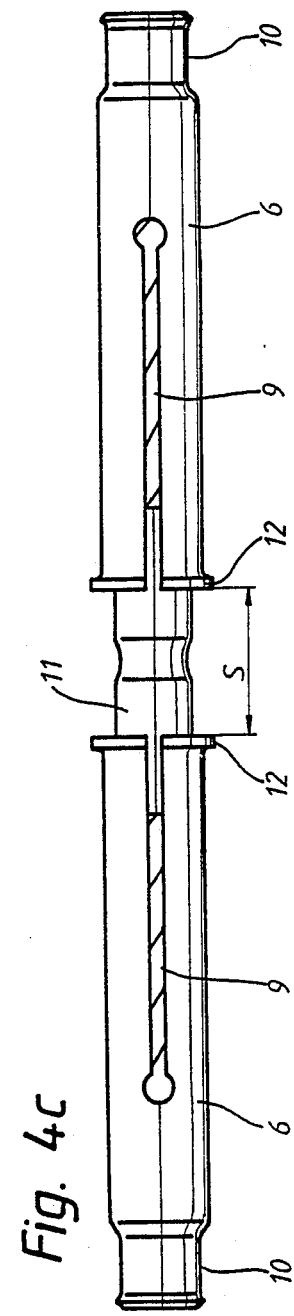

Since the free edge of the hollow connector pins is particularly highly stressed during its insertion into the openings which may require a hammering-in with a tight seat, a flanged-out edge 12 is applied in this area in the illustrative embodiment according to FIGS. 4a to c for stabilizing the hollow connector pin.

To protect the bunched conductor 7 in the area of abutment of the conductor rail or in the area of abutment of the hollow connector pins 6 against abrasions or mechanical damage when the joint is expanded, the bunched conductor is surrounded in the area of abutment by a firmly adhering sleeve 11 which extends in to the hollow connector pin 6. For the purpose of attachment, the sleeve 11 is crimped in a short area located in the center; it only loosely encloses the bunched conductor in the remaining area. As a result, a gradual transition from the pressed together bunched conductor diameter to an opened-out diameter in the compressed bunched conductor condition can be produced. The sleeve 11 can also consist of electrically insulating material.

Figure 3:
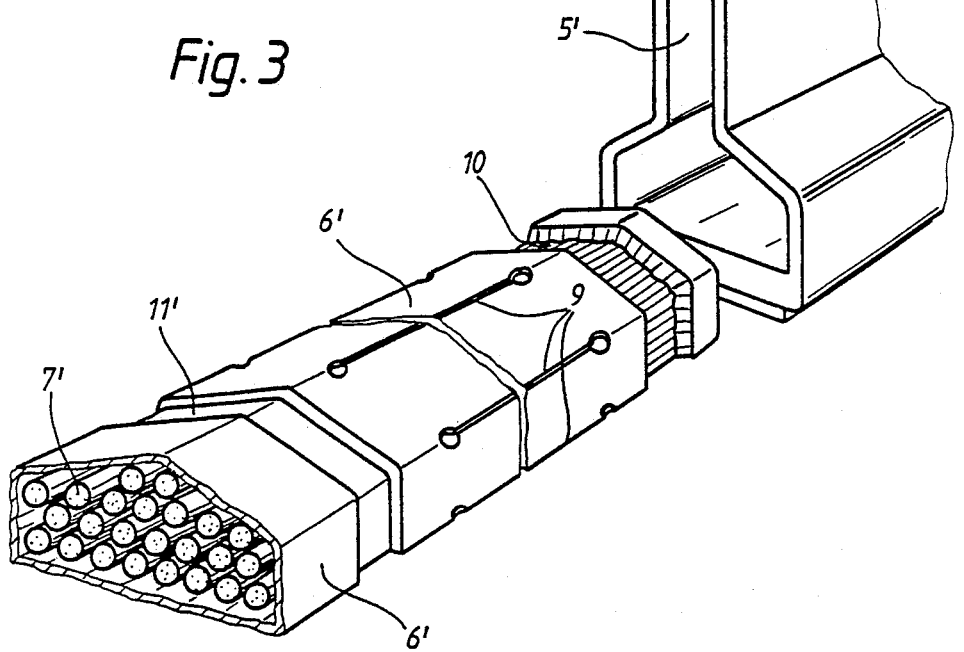
FIG. 3 is a schematic oblique, part sectional view which shows an electrically conductive connection having a non-circular connector cross-section being applied to a different conductor rail section according to another preferred embodiment of the invention.

The illustrative embodiment shown in FIG. 3 is intended to illustrate that the invention can also be implemented by means of non-circular connector pins. Corresponding to its double-T section, the conductor rail 1' exhibits an essentially hammer-shaped opening 5'. The lower transversely located portion of the area of the hammer-shaped opening 5' is utilized for inserting the current conduction cable. The non-circular section of the connector pin can be created by correspondingly externally deforming a pipe section or also by producing a corresponding extruded section. In the edge area, a longitudinal slot 9 is applied in each case, which, however, only extends over a part area of the length of the connector pin. The wall portions of the connector pin 6' extending between the slots 9 are first slightly domed toward the outside to ensure intimate contact-making with the inside surface of the opening 5'. Apart from the non-circular cross-section of the connector pins 6', of the sleeve 11' and of the bunched conductor 7', however, the current conduction cable according to FIG. 3 is basically constructed in a similarly manner to the current conduction cable according to FIG. 2 or FIGS. 4a to c.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Electrically conductive connection between abutting individual sections of conductor rails, comprising a current conduction cable formed of a multi-wire bunched conductor and of two contact portions which are electrically and securely attached to the ends of the bunched conductor, said rail sections having opposed end faces and said contact portions are attached to the opposed end faces of the conductor rails, wherein each of the contact portions are constituted in the form of at least one of a cylindrical or prismatic connector pin which are inserted into a corresponding cylindrical or prismatic axially extending opening of corresponding shape in said opposed end faces of the conductor rails.

2. Connection according to claim 1, wherein the bunched conductor extends on a length (l) corresponding to approximately 5 to 20 times the diameter (d) of the bunched conductor, the bunched conductor being in a hollow space in each said connector pin, the cross-section of each said hollow space being at least approximately 15 to 40 percent greater than the cross-sectional area enclosed by the outside contour of the connector pin around the bunched conductor in a stretched condition.

3. Connection according to claim 1, wherein the connector pin are longitudinally slotted.

4. Connection according to claim 2, wherein the connector pins are longitudinally slotted.

5. Connection according to claim 1, wherein the connector pins are of hollow construction.

6. Connection according to claim 5, wherein the bunched conductor extends into the interior of the hollow connector pins and an electrically conductive durable crimped connection is made between the bunched conductor and the outermost ends of the connector pins, one of the connector pins extending towards the other connector pin.

7. Connection according to claim 5, wherein the bunched conductor is protected by a firmly adhering sleeve in the area of the opposed end faces of the conductor rail sections.

8. Connection according to claim 7, wherein the center of the sleeve is crimped to the conductor and otherwise loosely encloses the bunched conductor.

9. Connection according to claim 6, wherein one end of each of the hollow connector pins is flanged outwardly.

* * * * *